(12) United States Patent
Bonacini

(10) Patent No.: US 7,048,026 B2
(45) Date of Patent: May 23, 2006

(54) MACHINE FOR FITTING AND REMOVING TIRES AND WHEEL RIMS FOR VEHICLES

(75) Inventor: Maurizio Bonacini, Correggio (IT)

(73) Assignee: Giuliano S.R.L., Correggio (IT)

( * ) Notice: Subject to any disclaimer, the term of this patent is extended or adjusted under 35 U.S.C. 154(b) by 50 days.

(21) Appl. No.: 10/831,148

(22) Filed: Apr. 26, 2004

(65) Prior Publication Data

US 2004/0221964 A1 Nov. 11, 2004

(30) Foreign Application Priority Data

May 9, 2003 (IT) .......................... MO2003A0132

(51) Int. Cl.
*B60C 25/128* (2006.01)
(52) U.S. Cl. ..................... 157/1.28; 157/1.17
(58) Field of Classification Search ................ 157/1.17, 157/1.3, 1.28
See application file for complete search history.

(56) References Cited

U.S. PATENT DOCUMENTS 6,408,921 B1 * 6/2002 Bonacini .................... 157/1.24
6,443,206 B1 * 9/2002 Bonacini .................... 157/1.24
6,588,478 B1 * 7/2003 Vignoli ...................... 157/1.28
6,619,362 B1 * 9/2003 Corghi ....................... 157/1.24
6,823,922 B1 * 11/2004 Gonzaga ..................... 157/1.3

FOREIGN PATENT DOCUMENTS

| EP | 1 026 017 | 8/2000 |
|---|---|---|
| EP | 1 052 120 | 11/2000 |
| EP | 1 314 584 | 5/2003 |

* cited by examiner

*Primary Examiner*—David B. Thomas
(74) *Attorney, Agent, or Firm*—Albert Josif; Daniel O'Byrne

(57) ABSTRACT

A machine for fitting/removing tires and wheel rims for vehicles, comprising a frame for supporting elements for coupling and turning a rim, onto/from which a tire is to be fitted/removed, about a rotation axis, and a working assembly that is movably supported by the frame and comprises a working head for fitting and removing the rim/tire associated with a first translational actuation, and is provided with a tubular pusher transverse to the rotation axis, and associated with an abutment surface associable with a tire side, and with at least one tire removal tool associated with a second actuation for alternate movement between an inactive configuration at least partially within the pusher, and at least one active configuration, protruding at least partially from the pusher.

19 Claims, 12 Drawing Sheets

MACHINE FOR FITTING AND REMOVING TIRES AND WHEEL RIMS FOR VEHICLES

The present invention relates to a machine for fitting and removing tires and wheel rims for vehicles.

BACKGROUND OF THE INVENTION

It is known that vehicle wheels are generally constituted by a metal rim that is provided peripherally with annular folds between which an elastic tire is keyed; the end portions of said tire, known as beads, each abut against a respective fold of said rim.

Tires and the associated rims are currently fitted and removed by using machines, known as tire changing machines, which allow to remove the tire from the corresponding rim in order to perform for example maintenance or replacement of the inner tube and subsequently refit the same tire or a replacement tire on the wheel rim.

For example, tire changing machines of the automatic type are known which are substantially constituted by a frame for supporting means for coupling and rotating a rim on/from which a tire is to be fitted/removed, and by a working assembly that is provided with a working head for fitting and removing the tire.

Such working head is generally provided with a tool for fitting the tire on the rim and with a tool for removing the tire.

The removal tool, in particular, is arranged substantially transversely to the longitudinal axis of the working head and is provided with a curved end part that is directed toward the wheel to be removed during intervention.

The end part of said tool must be placed in abutment against a side of the tire and pressed against it so as to move the bead of the tire away from the corresponding fold, so as to allow said tool to engage the flap of the tire and move it away from the corresponding rim.

The removal tool is generally supported by the working head so that it can oscillate, about an axis that is fixed with respect to said head, between a configuration for pushing the side of the tire and engaging the corresponding bead and at least one configuration for moving the tire away from the corresponding rim.

These tire changing machines are not free from drawbacks, including the fact that if the tire bead is not gripped in an optimum manner, the removal tool can remain jammed between the tire and the rim, requiring manual intervention of the operator, who has to force the tire with one or more levers in order to release the tool.

Moreover, said machines have limitations that penalize their operating flexibility.

SUMMARY OF THE INVENTION

The aim of the present invention is to eliminate the above-mentioned drawbacks of known tire fitting machines, by providing a machine for fitting and removing tires and wheel rims for vehicles that allows to perform fitting and removal operations simply and rapidly and does not entail onerous expenditures of time if the bead of the tire to be removed is not gripped correctly.

Within this aim, an object of the present invention is to provide a machine that can be used for a wide range of wheel types regardless of their characteristics (hard or soft rubber) and dimensions.

Another object of the present invention is to provide a machine that is simple, relatively easy to provide in practice, safe in use, effective in operation, and has a relatively low cost.

This aim and these and other objects that will become better apparent hereinafter are achieved by the present machine for fitting and removing tires and wheel rims for vehicles, which comprises a frame for supporting means for coupling and turning a rim, onto/from which a tire is to be fitted/removed, about a rotation axis, and a working assembly that is supported by said frame so that it can move and comprises a working head for fitting and removing said rim and said tire that is associated with first means for translational actuation in a direction that is substantially parallel to said rotation axis, characterized in that said working head is provided with a pusher that is substantially tubular, is arranged substantially transversely to said rotation axis, and is associated with an abutment surface that is associable with a side of said tire, and with at least one tool for removing said tire from said rim, which is associated with second actuation means that are suitable to allow it to move alternately between an inactive configuration, in which it is at least partially accommodated within said pusher, and at least one active configuration, in which it protrudes at least partially from said pusher.

BRIEF DESCRIPTION OF THE DRAWINGS

Further characteristics and advantages of the present invention will become better apparent from the following detailed description of a preferred but not exclusive embodiment of a machine for fitting and removing tires and rims of wheels for vehicles, illustrated by way of non-limiting example in the accompanying drawings, wherein.

DESCRIPTION OF THE PREFERRED EMBODIMENTS

Figure 1:
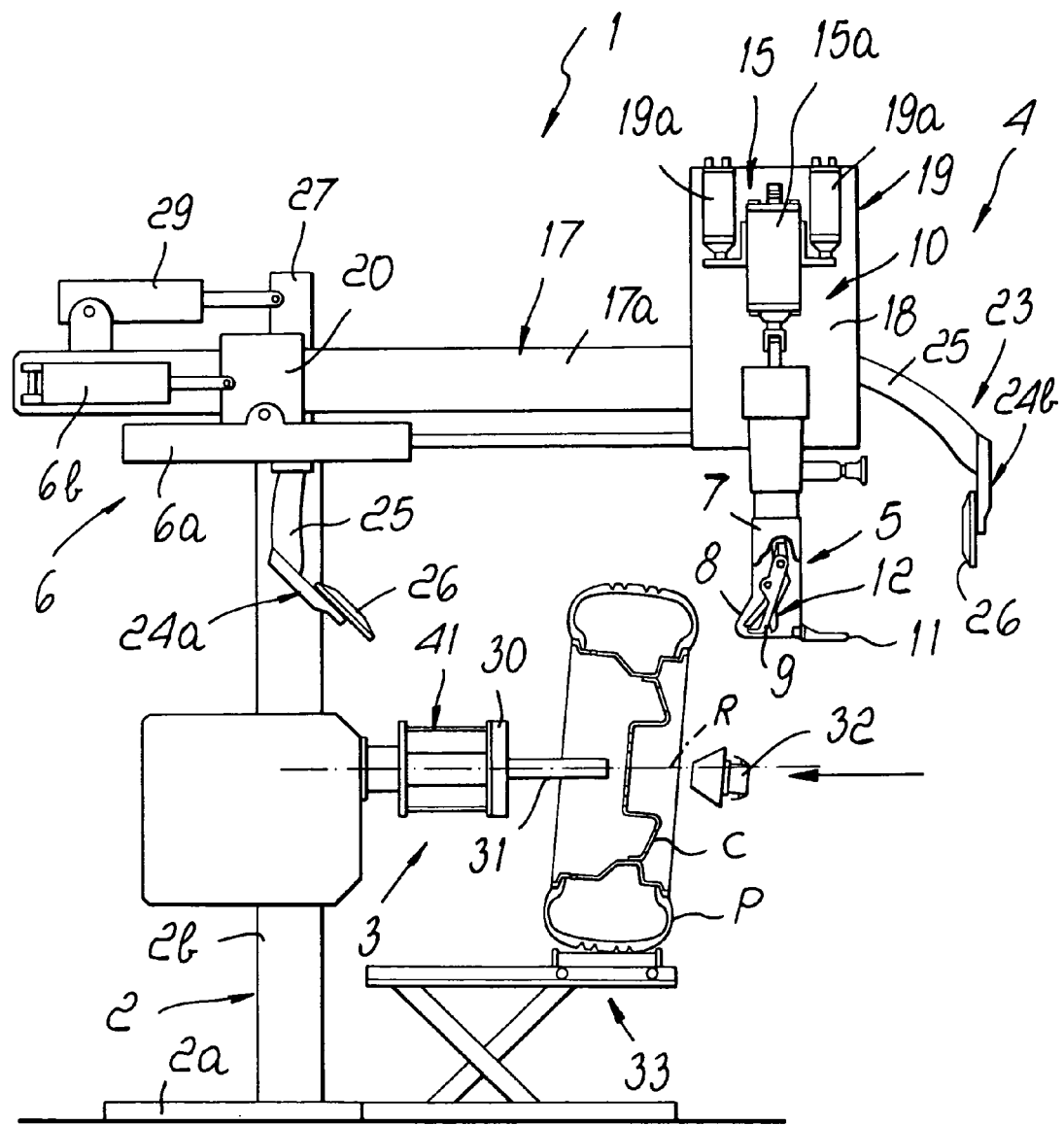
FIGS. 1 to 3 are partially sectional schematic side views of the machine for fitting and removing tires and rims of wheels for vehicles according to the invention in successive operating steps during the removal of a tire from the corresponding rim.

With reference to the figures, the reference numeral 1 generally designates a machine for fitting and removing tires and rims of wheels for vehicles.

The machine 1 comprises a frame 2 for supporting means 3 for coupling and turning a rim C, on/from which it is necessary to fit/remove a tire P, about a rotation axis R, and a working assembly 4 that is supported so that it can move by the frame 2 and is provided with a working head 5 for fitting and removing the rim C and the tire P.

The head 5 is associated with first actuation means 6 for translational actuation in a direction that is parallel to the rotation axis R, which are constituted by a first actuator 6a that acts in a horizontal direction and is associated with said head.

The frame 2 is constituted by a footing 2a from which a vertical column 2b rises; the means 3 are associated so that they can slide along said column, and the rotation axis R is arranged horizontally.

As an alternative, the machine 1 could be provided with a differently structured frame 2 and/or the rotation axis R could be arranged substantially vertically or otherwise inclined.

Figure 4:
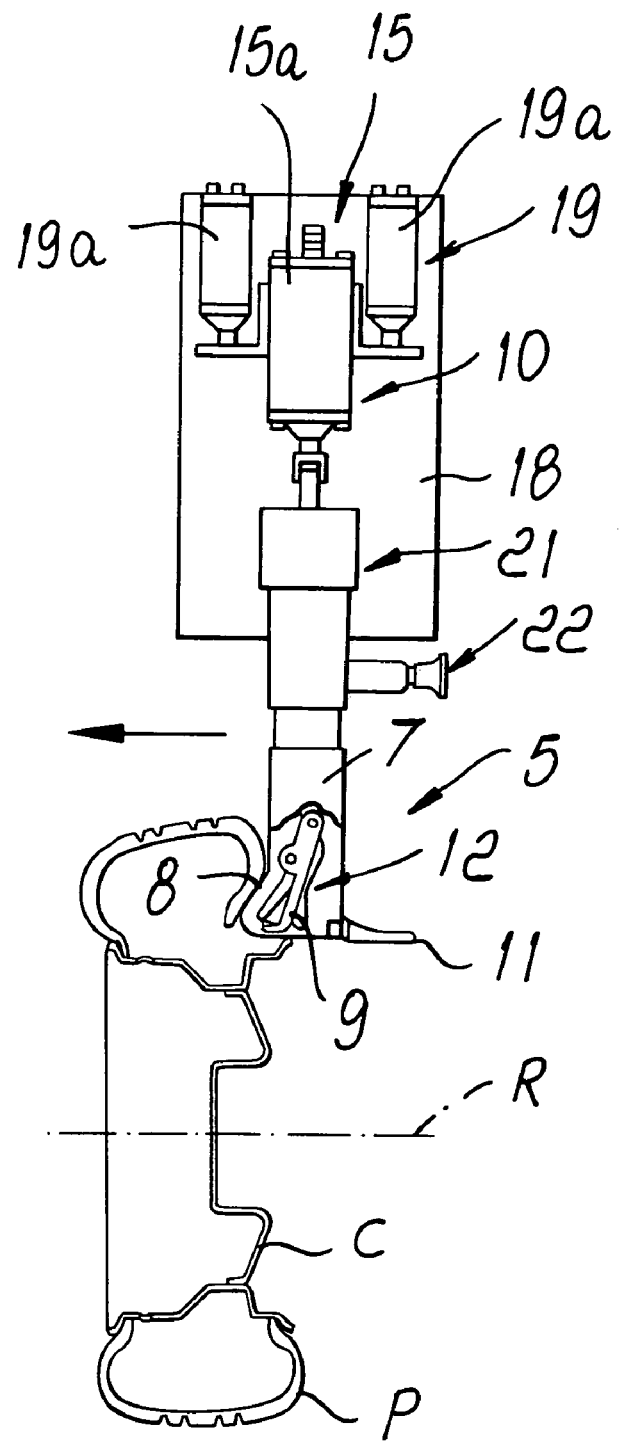
FIGS. 4 and 5 are partially sectional schematic side views of a portion of the machine of FIG. 1 during tire removal.

The head 5 is provided with a pusher 7 that is substantially tubular, is arranged vertically above the supporting means 3 and transversely to the rotation axis R, and is provided with an abutment surface 8 that is associable with a side of the tire P during removal thereof (FIG. 4).

The pusher 7 has an open lower end.

Figure 11:
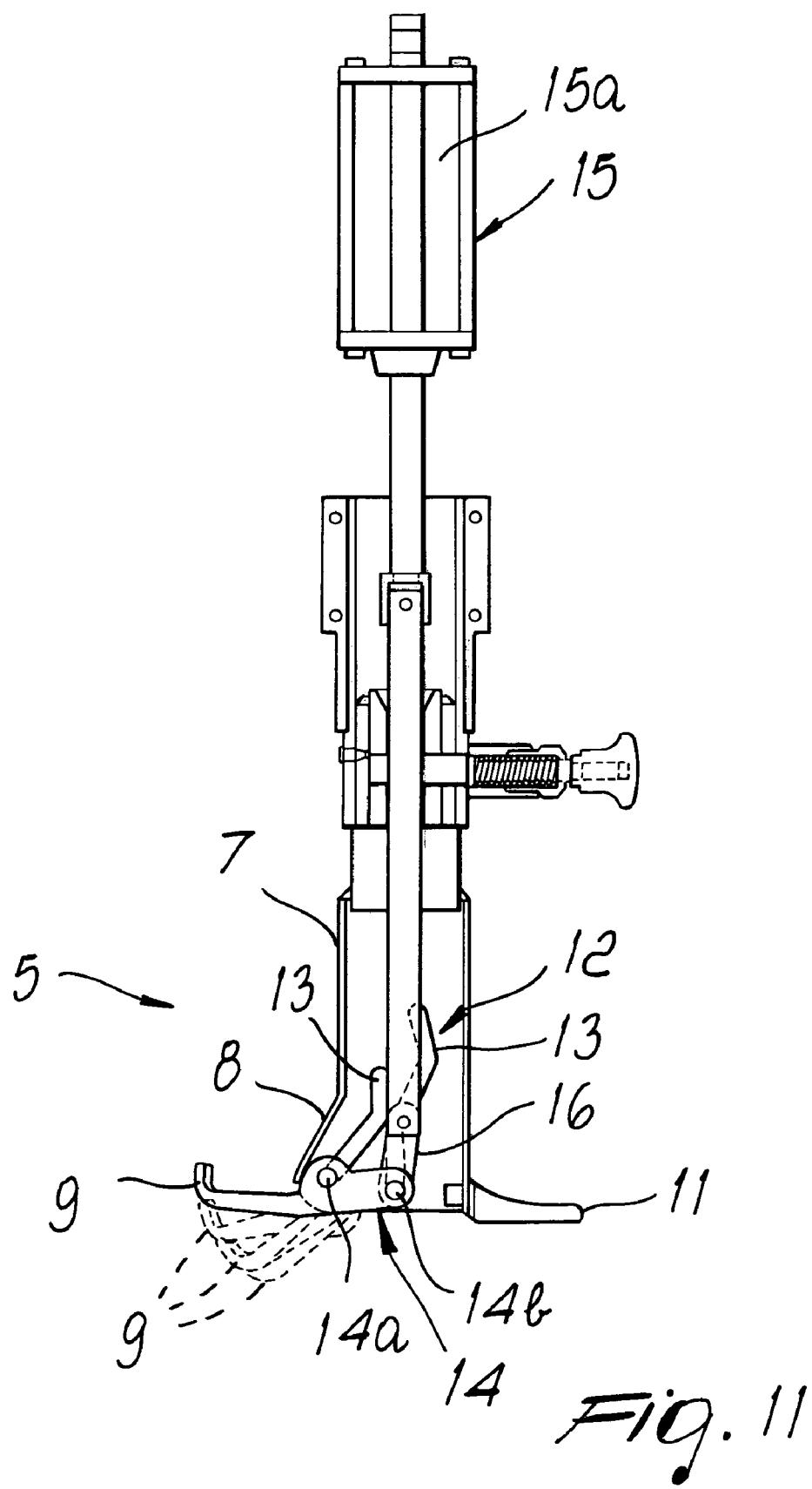
FIG. 11 is a schematic sectional view, taken along a longitudinal plane, of the working head of FIG. 10, with the removal tool in the active configuration.
Figure 12:
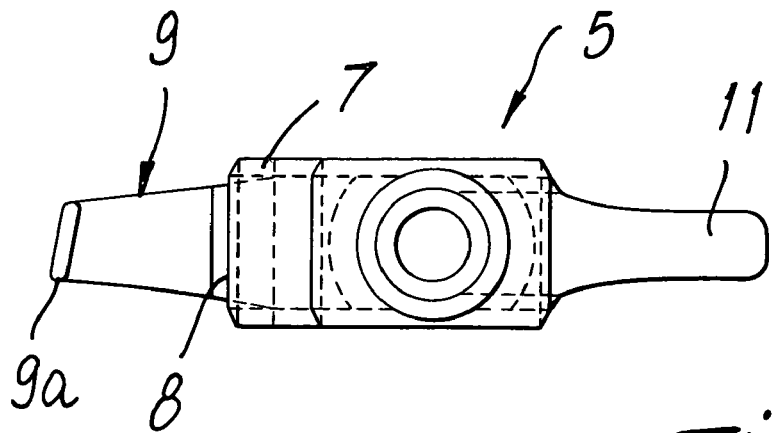
FIG. 12 is a transverse sectional view, taken along the line XII—XII of FIG. 11, of the working head.
Figure 13:
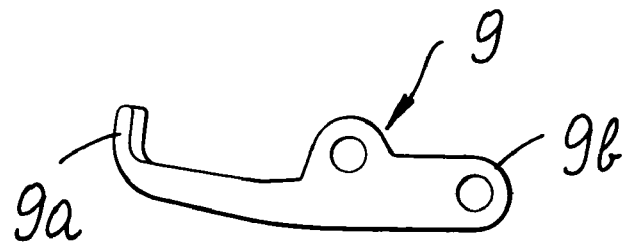
FIG. 13 is a side view of the removal tool of the machine according to the invention.
Figure 14:
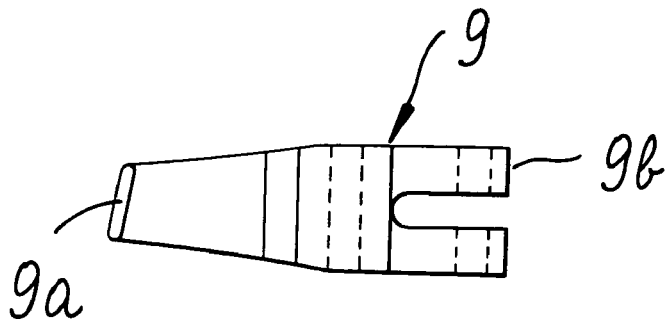
FIG. 14 is a plan view of the removal tool of FIG. 13.

The head 5 further has at least one tool 9 for removing the tire P from the rim C, which is associated with second actuation means 10 that are suitable to allow its movement alternately between an inactive configuration, in which it is contained at least partially inside the pusher 7, and an active configuration, in which it protrudes partially from said pusher (FIG. 11).

Figure 10:
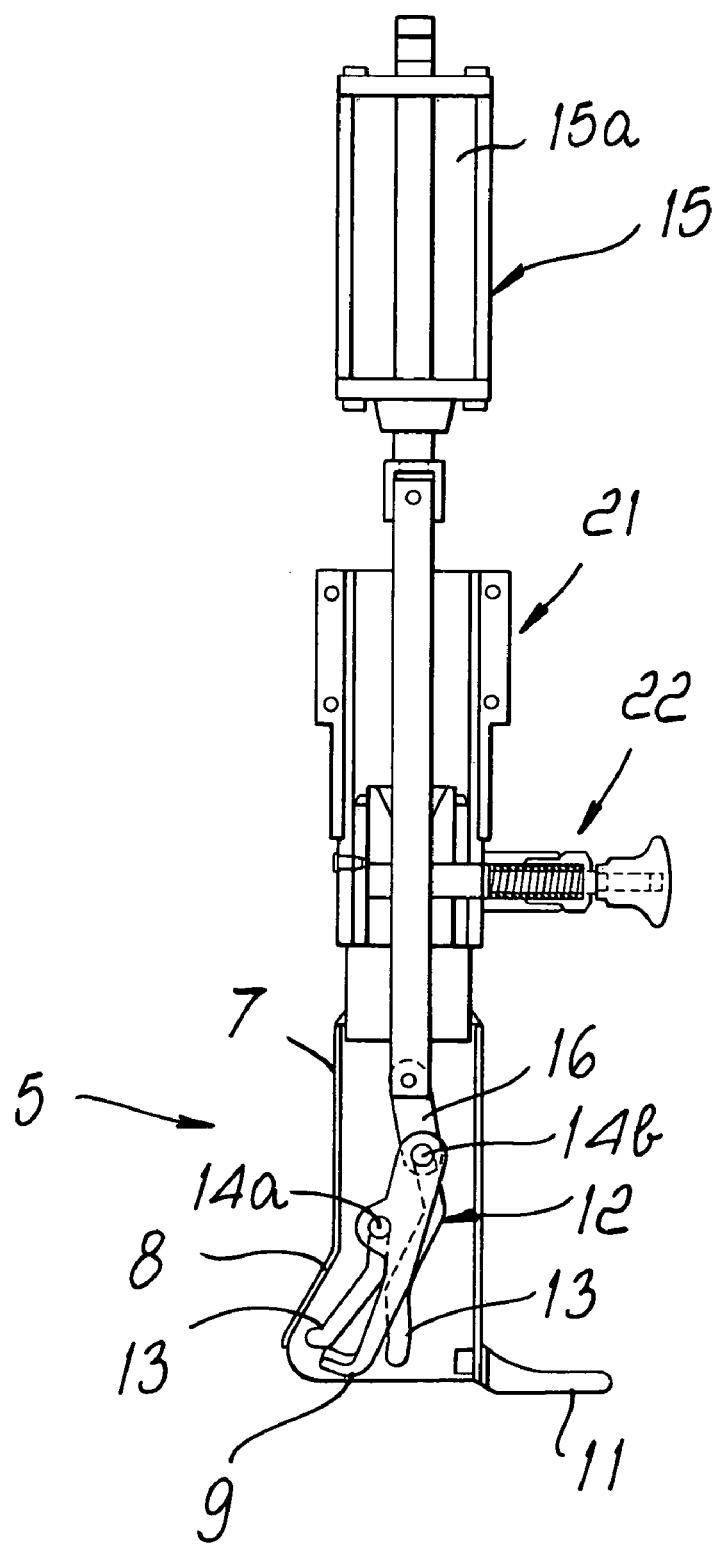
FIG. 10 is a schematic sectional view, taken along a longitudinal plane, of the working head of the machine according to the invention with the removal tool in the inactive configuration.

Advantageously, in the particular embodiment shown, the tool 9 is completely accommodated within the pusher 7 in the inactive configuration (FIG. 10).

Figure 7:
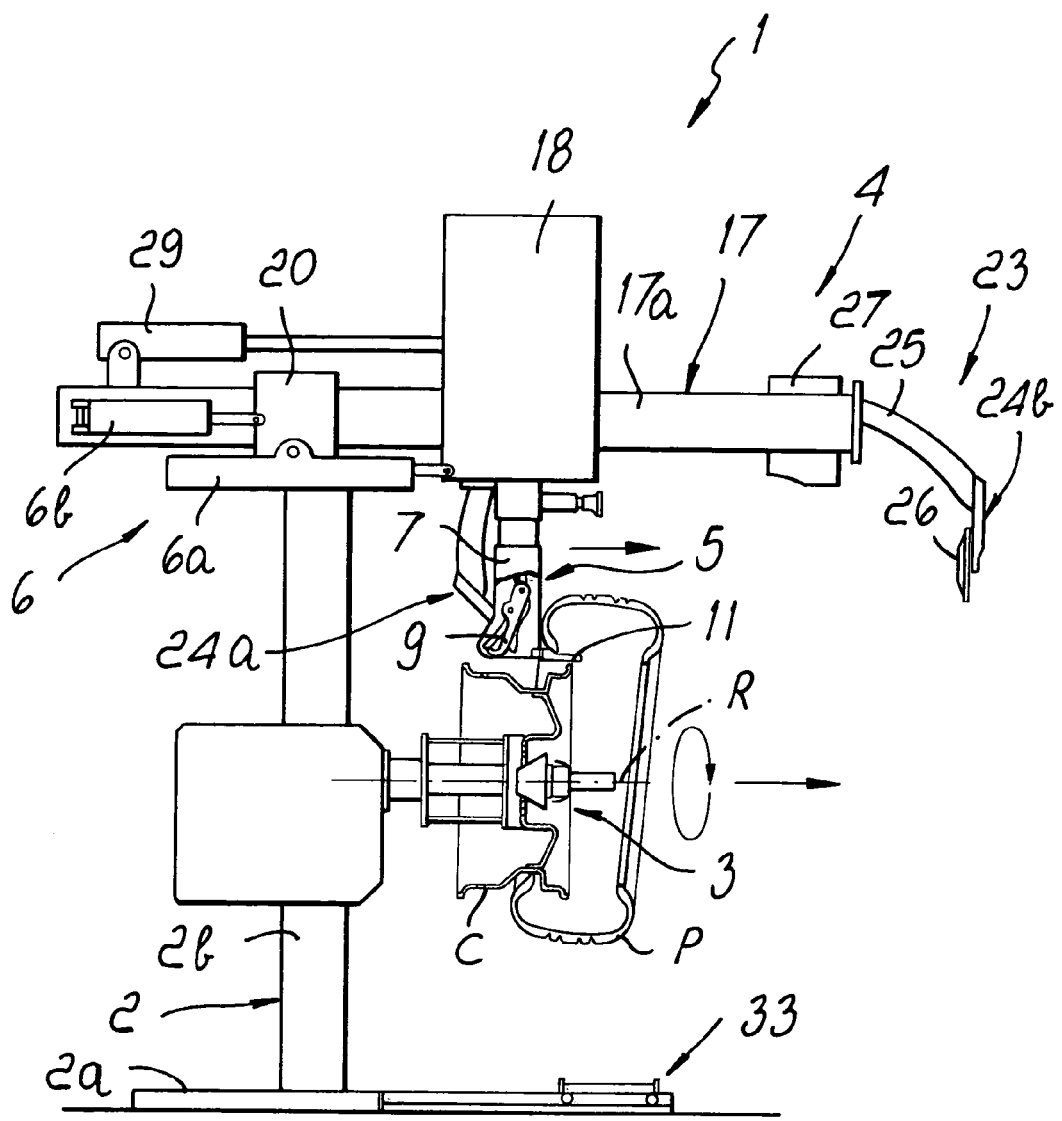
Figure 8:
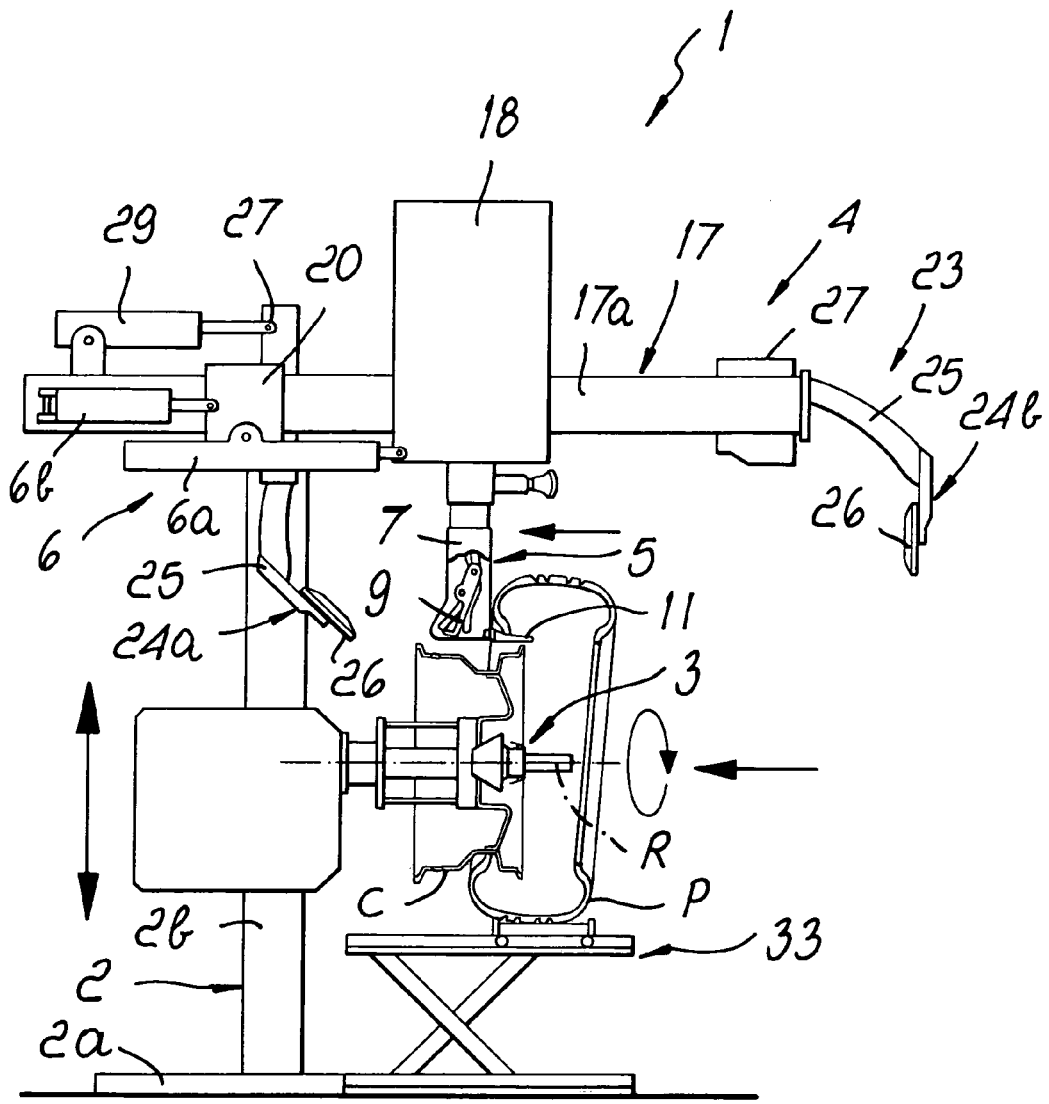
FIGS. 8 and 9 are two partially sectional schematic side views of the machine shown in the preceding figures, in two successive steps of work during the fitting of the tire on the rim.
Figure 9:
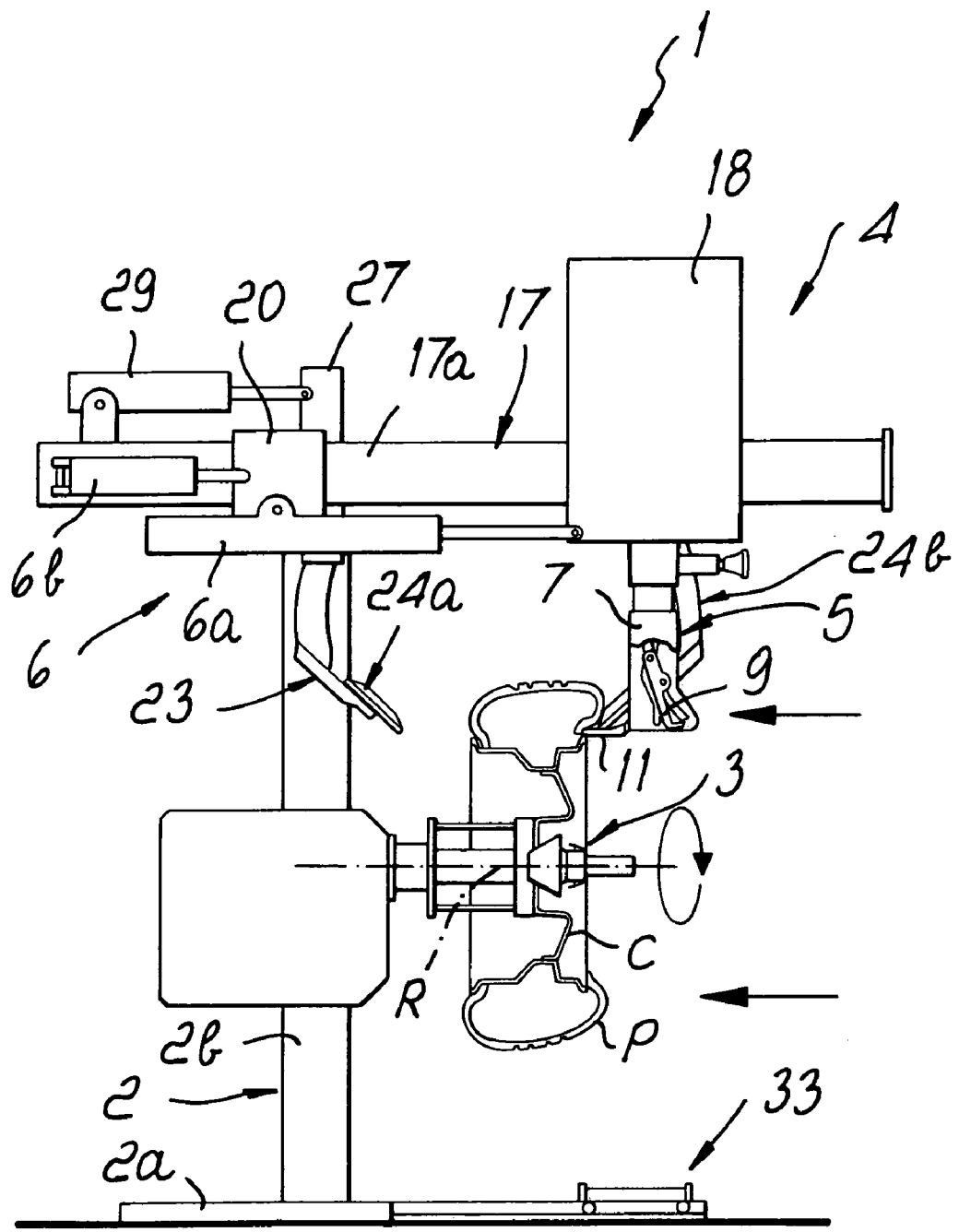

Finally, the head 5 is conveniently provided with a supporting tool 11 for supporting the tire P, which acts during removal in order to move said tire away from the rim C (FIG. 7) and during fitting in order to position it on said rim (FIGS. 8 and 9).

The tool 11 is constituted by a plate that is rigidly associated at the lower end of the pusher 7 and cantilevers out on the opposite side of the abutment surface 8.

The abutment surface 8 is shaped so as to protrude toward the tire P to be removed, so as to form a wedge-shaped element.

The end 9a of the tool 9 that is directed toward the tire P is hook-shaped and suitable to abut against the inner surface of the bead of the tire.

The second actuation means 10 comprise guiding means 12 for guiding the tool 9, which are constituted by two pairs of through slots 13 that are formed on the side wall of the pusher 7, preferably monolithically with and at the internal lateral surface of the pusher 7; the slots 13 of each pair are mutually identical and are arranged so as to face each other in a mirror-symmetrical fashion on opposite sides of said pusher.

Each pair of slots 13 is associated with a respective pivot 14 (in particular 14a, 14b), which is arranged transversely with respect to the tool 9, is associated or connected with said tool, and has each end arranged at, or associated so that it can slide along a corresponding slot 13.

Each slot 13 is constituted by a plurality of segments or portions that are mutually connected so as to form a broken line path.

The profiles of the slots 13 are sized so as to guide the tool 9 in a combined (rotary and translational) motion between the inactive configuration and the active configuration.

The figures show only one slot 13 for each pair.

The two pivots 14a and 14b are arranged respectively proximate to the centerline of the tool 9 and to the end 9b that lies opposite the hook-shaped end 9a, the end 9b being fork-shaped.

Moreover, the second actuation means 10 comprise motion means 15 for producing an alternating rectilinear motion, which are constituted by a second actuator 15a that uses a fluid medium and acts in a vertical direction, and are associated with the tool 9 by means of the interposition of a linkage 16.

The ends of the linkage 16 are respectively articulated to the lower end of the stem of the second actuator 15a and to the end 9b of the tool 9 at the pivot 14b.

The frame 2 comprises a guiding element 17, which is constituted by a profiled element that has an I-shaped transverse cross-section, is arranged so that its wings are vertical, and protrudes parallel to the rotation axis R from the upper portion of the column 2b.

The assembly 4 comprises a slider 18 for supporting the head 5, which is associated so that it can slide along the guiding element 17 and comprises a first portion and a second portion, the first portion being associated with said guiding element, the second portion supporting the head 5 and being associated with the first portion so that it can move.

The second portion of the slider 18 supports the second actuator 15a.

The machine 1 further comprises third actuation means 19 for actuating the head 5 with a vertical translational motion, which are constituted by two third actuators 19a that use a fluid medium, act at right angles to the rotation axis R, and are interposed between said portions of the slider 18 and on opposite sides of the second actuator 15a.

The assembly 4 further comprises an additional slider 20, which is associated so that it can slide along the guiding element 17 and is interposed between the slider 18 and the column 2b.

Conveniently, the first actuation means 6 comprise a first additional fluid-medium actuator 6b, which acts in a direction that is parallel to the rotation axis R and is interposed between the guiding element 17 and the additional slider 20; the actuation of the first additional actuator 6b produces the translational motion of the additional slider 20 with respect to the guiding element 17 and therefore with respect to the frame 2.

The first actuator 6a is instead interposed between the additional slider 20 and the slider 18; actuation of the first actuator 6a produces the translational motion of the slider 18 with respect to the additional slider 20.

The sliders 18 and 20 are associated so that they can slide along a same wing 17a of the guiding element 17.

The assembly 4 is provided with conventional means 21 for rotating the head 5 about a vertical axis that substantially coincides with the longitudinal axis of said head; such means allow to arrange the tool 11 adjacent to both sides of the tire P (FIGS. 10 and 11).

In the illustrated embodiment, the rotation means 21 are of the manual type, but alternative embodiments in which said means are actuated automatically are not excluded.

The rotation means 21 are provided with a device 22 for stopping the rotation of the head 5, which allows to lock said head in two mutually angularly offset configurations.

Finally, the assembly 4 comprises means 23 for separating the tire P from the rim C, which perform the operation conventionally known as bead breaking.

The separation means 23 are constituted by two pushers 24, which are associated so that they can slide along the guiding element 17 on opposite sides of the tire P being treated and are constituted by respective arms 25 for supporting disks 26 that are keyed freely on said arms and can be associated with the sides of the tire P.

The pusher 24a cooperates with the side of the tire P that is directed toward the column 2b, while the pusher 24b is suitable to cooperate with the side of the tire P that is directed toward the free end of the guiding element 17.

Each arm 25 is fitted on a corresponding support 27 that is associated so that it can slide along the wing of the guiding element 17 that lies opposite the wing 17a along which the sliders 18 and 20 are arranged.

The arm 25 of the pusher 24a is rigidly coupled to the corresponding support 27, while the arm 25 of the pusher 24b is associated with the corresponding support 27 so that it can oscillate about an axis that is horizontal and transverse with respect to said element between a configuration that is adjacent to the rim C and a configuration that is spaced from said rim.

Each arm 25 of the pushers 24a and 24b is associated with an actuator 29, which is suitable to actuate respectively the translational motion along the guiding element 17 and the translational motion along said element combined with rotation.

Conveniently, the means 3 comprise a flange 30 for supporting the rim C, which is associated with conventional motor means, not shown in the figures, which actuate its rotation about the rotation axis R, a reference rod 31 on which the rim C is fitted, said rod protruding from the center of the flange 30 in a horizontal direction and having a threaded end, and a threaded locking element 32, which couples on the rod 31 and clamps the rim C being processed.

Moreover, the means 3 are associated with conventional actuation means, not shown in the figures, which produce their translational motion along the column 2b.

The machine 1 is further provided with means 33 for lifting and lowering the rim C and the tire P for loading and unloading the means 3, said means not being shown in detail because they are of a conventional type.

Finally, the machine 1 is associated with conventional actuation and control means, not shown in the figures, which allow the operator to actuate its operation and adjust its movements.

The operation of the invention is as follows: during removal, the operator positions the wheel being processed with the aid of the lifting and lowering means 33, optionally positioning conveniently the means 3 along the column 2b, fixing the rim C to said means (FIG. 1).

Figure 2:
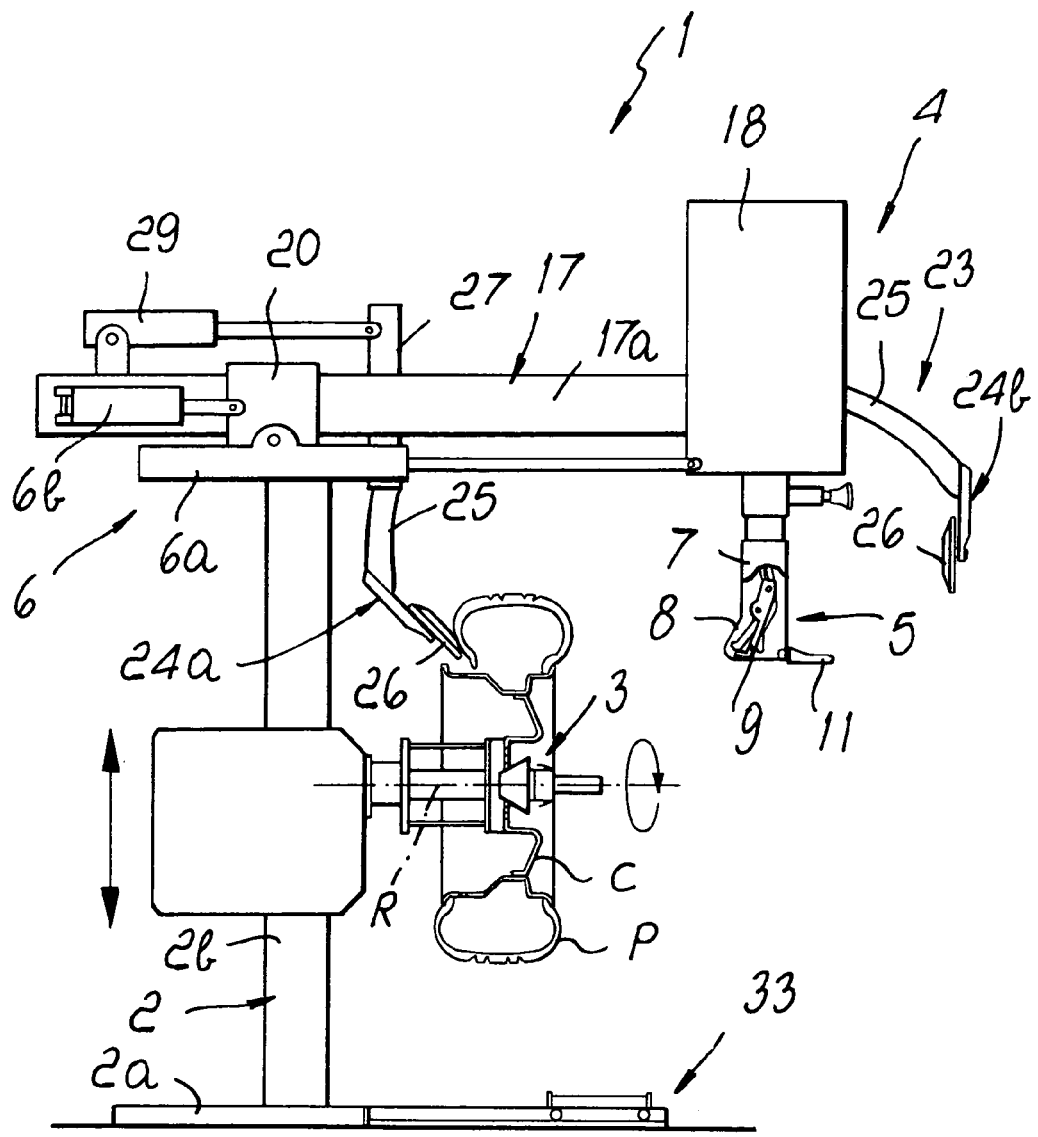
Figure 3:
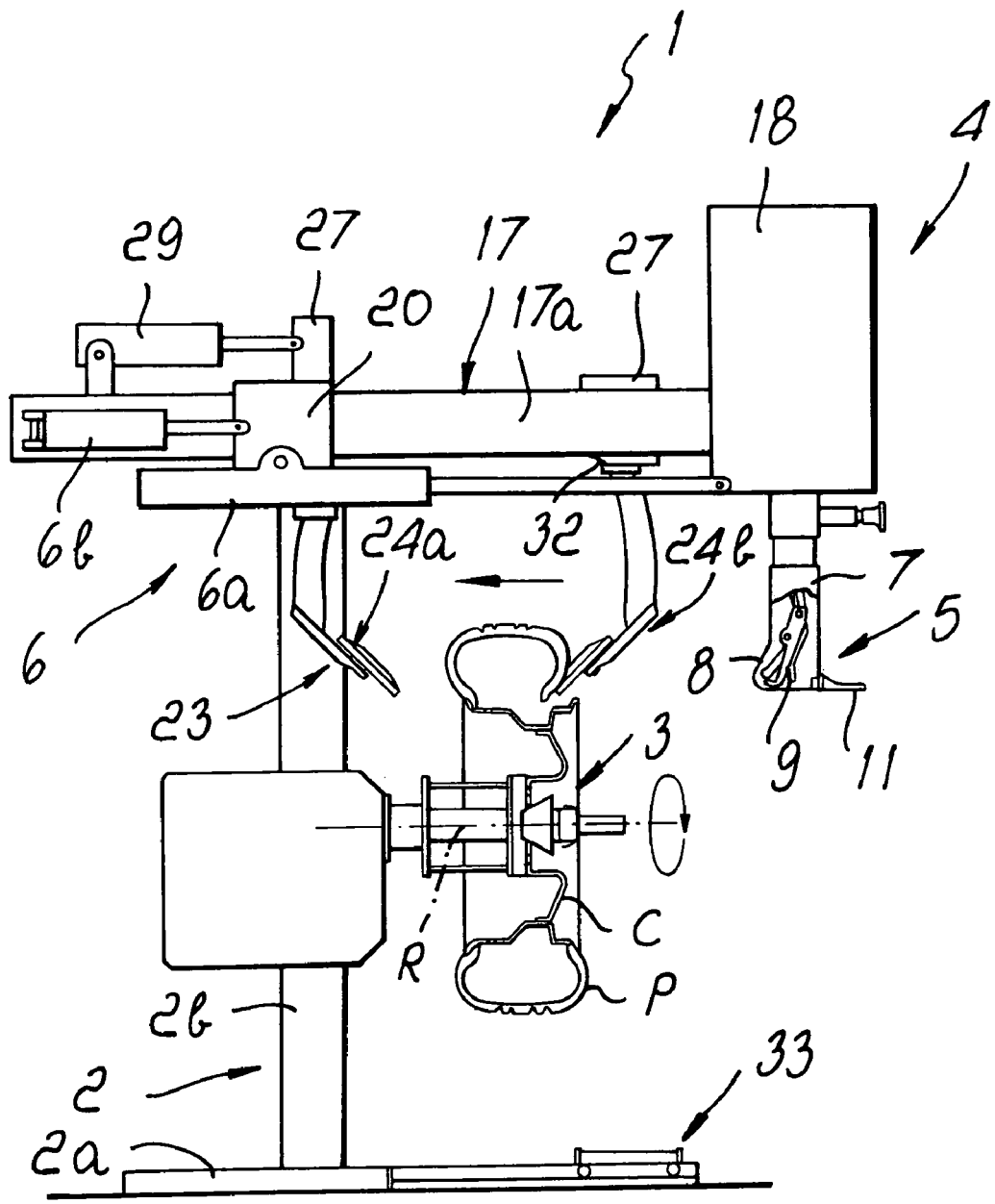

Then the so-called internal and external bead breaking operation is performed (FIGS. 2 and 3), alternatively placing the pushers 24 in contact with the corresponding sides of the tire P by means of the corresponding actuators 29 and turning the wheel by way of the means 3.

The bead-breaking step allows to separate the beads of the tire P from the corresponding seats on the rim C.

In order to perform actual removal of the tire P, the pushers 24 move away from the region adjacent to said tire and the pusher 24b moves to a spaced configuration so as not to interfere with the head 5.

By way of the first actuator 6a, and by actuating the sliding of means 3 along the column 2b, the head 5 is arranged at a suitable distance from the rim C, depending on the dimensional and constructive characteristics of said rim.

The head 5, with the tool 9 in the inactive configuration, is then moved toward the tire P by means of the actuator 6a so that the abutment surface 8 abuts against the side of the tire P, moving it away from the rim C (FIG. 4) and forming a passage for the tool 9.

Figure 5:
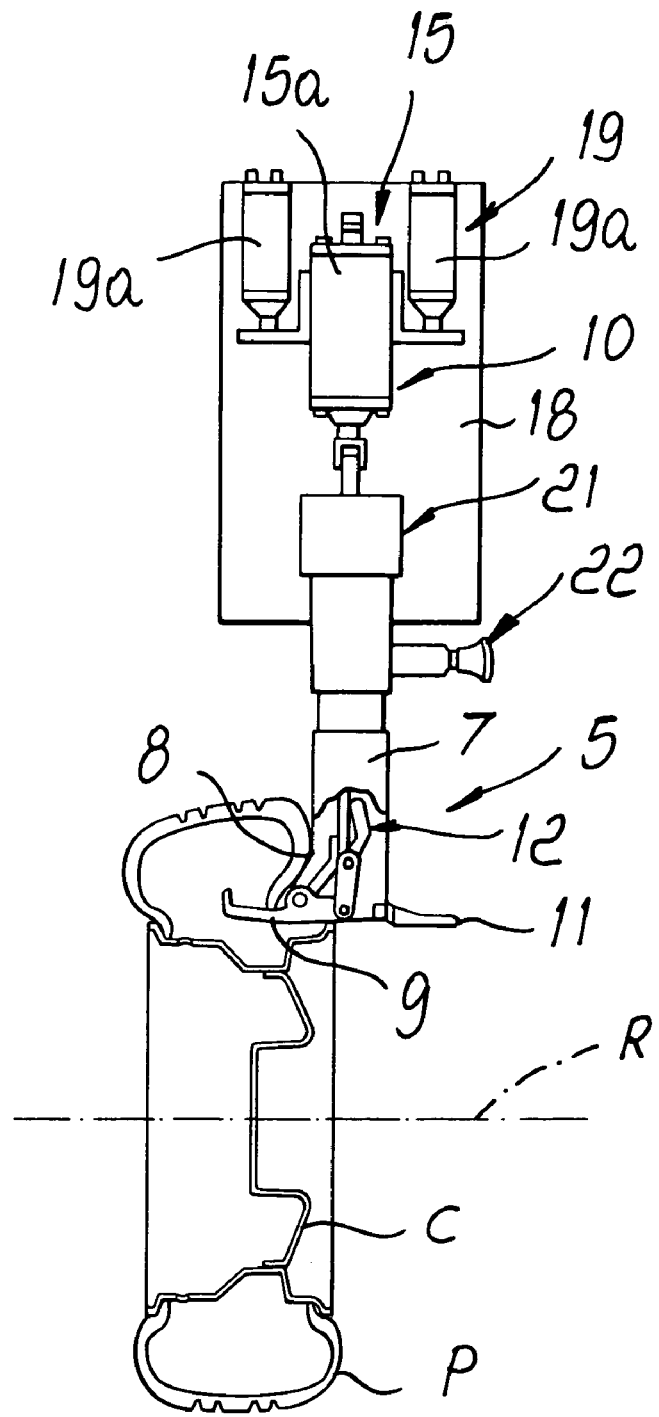

Activation of the actuator 15a moves the tool 9 into the active configuration; the tool 9 is inserted between the tire P and the rim C and internally grips the bead of said tire with its hook-shaped end 9a (FIG. 5).

Figure 6:
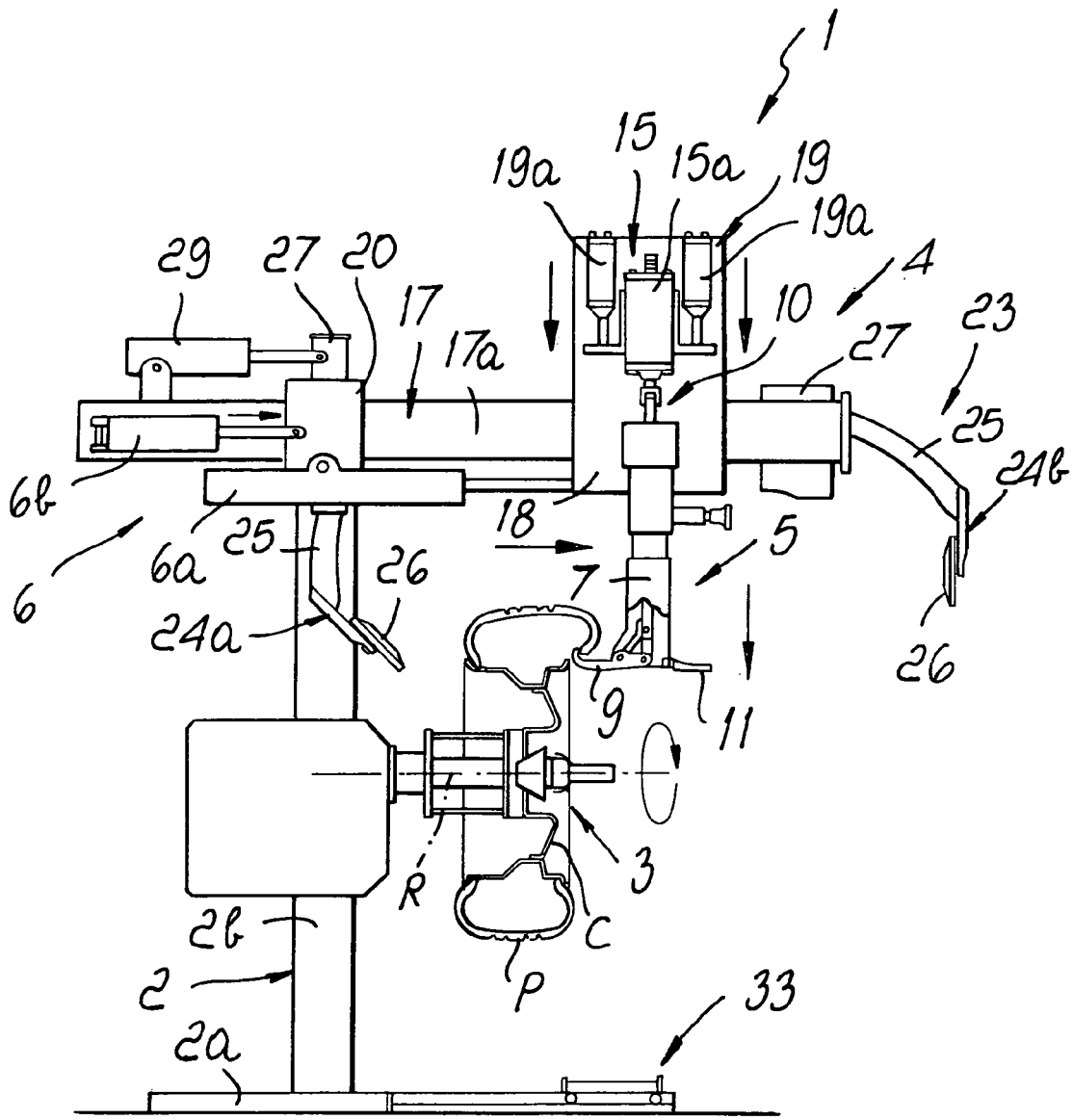
FIGS. 6 and 7 are partially sectional schematic side views of the machine of FIG. 1 in further operating steps during tire removal.

Then, by the opening of the first additional actuator 6b combined sequentially with the opening of the third actuators 19a, the movement of the head 5 is actuated with the tool 9 being in the active configuration, so as to partially pull the tire P off the rim C (FIG. 6).

By way of the subsequent rotation of the rim C, actuated by the means 3, the tire P is disengaged completely.

Then, by closing the first actuator 6a, the head 5 is placed proximate to the column 2b, so that the tool 11 grips the corresponding bead of the tire P.

The opening of the first actuator 6a causes the head 5 to push the tire P, supported by the tool 11, away from the rim C, so as to completely separate said tire (FIG. 7); in this work step, the pusher 24a can cooperate in removing the tire P from the rim C.

During fitting, instead, the tire P is lifted proximate to the rim C, which is already fixed to the means 3, with the aid of the lifting and lowering means 33, and the corresponding beads are seated on the rim C by means of the intervention of the tool 11 (FIG. 8), or the tool 11 and the pusher 24b (FIG. 9), while the rim C is rotationally actuated about the axis R by the means 3.

In practice it has been found that the described invention achieves the intended aim and objects.

The invention thus conceived is susceptible of numerous modifications and variations, all of which are within the scope of the appended claims.

All the details may further be replaced with other technically equivalent ones.

In practice, the materials used, as well as the shapes and the dimensions, may be any according to requirements without thereby abandoning the scope of the protection of the appended claims.

The disclosures in Italian Patent Application No. MO2003A000132 from which this application claims priority are incorporated herein by reference.

What is claimed is:

1. A machine for fitting and removing tires and wheel rims for vehicles, comprising: a frame; supporting means mounted at said frame for coupling and turning a rim, onto/from which a tire is to be fitted/removed, about a rotation axis; and a working assembly movably supported by said frame and comprising a working head for fitting and removing said rim and said tire, first actuation means operatively connected with said working head far translational actuation in a direction that is substantially parallel to said rotation axis, a pusher, provided at said working head that is substantially tubular, is arranged substantially transversely to said rotation axis, and is provided with an abutment surface that is adapted for working contact with a side of said tire, at least one removal tool for removing said tire from said rim, and second actuation means that are operatively connected with said at least one removal tool for causing alternate movement thereof between an inactive configuration, in which the removal tool is at least partially accommodated within said pusher, and at least one active configuration, in which the removal tool protrudes at least partially from said pusher, said second actuation means comprising guiding means for guiding said at least one removal tool, said guiding means comprising at least one slot that is provided at a side wall of said pusher, and at least one pivot that is connected to said at least one removal tool and arranged so as to slide along said at least one slot.

2. The machine of claim 1, wherein said at least one removal tool is completely accommodated inside said pusher in the inactive configuration.

3. The machine of claim 1, wherein said working head comprises a supporting tool for supporting said tire provided at said pusher.

4. The machine of claim 3, comprising third actuation means for translational actuation of said working head in a direction that is substantially perpendicular to said rotation axis, said third means being arranged at said working head.

5. The machine of claim 4, wherein said third actuation means comprises at least one third fluid-medium actuator.

6. The machine of claim 3, wherein said supporting tool is arranged in a cantilevered manner at said pusher on an opposite side thereof with respect to said abutment surface.

7. The machine of claim 3, wherein said rotation axis lays substantially horizontally.

8. The machine of claim 3, wherein said rotation axis lays substantially vertically.

9. The machine of claim 1, wherein said abutment surface is shaped with a contoured protrusion that extends toward said tire that forms a wedge-shaped element.

10. The machine of claim 1, wherein said at least one removal tool comprises a hook-shaped end adapted to abut against an internal surface of said tire.

11. The machine of claim 1, wherein said at least one slot is formed monolithically with an internal lateral surface of said pusher.

12. The machine of claim 1, wherein said at least one slot is a trough slot.

13. The machine of claim 1, wherein said at least one slot is constituted by a plurality of portions that are connected to each other so as to form a broken line path.

14. The machine of claim 1, wherein said guiding means comprise at least two slots which are substantially identical and are arranged in a mirror-symmetrical configuration so as to face each other on opposite sides of said pusher, said pivot comprising ends thereof that are each arranged for sliding motion along a respective one of said slots.

15. The machine of claim 1, wherein said guiding means comprise two pairs of slots and two pivots, said pivots having respective ends thereof that are each arranged for sliding motion along the slots of a corresponding pair of said slots.

16. The machine of claim 15, wherein said pivots are arranged substantially transversely to said at least one removal tool and are connected to said tool, respectively proximate to a centerline and at an opposite end thereof, with respect to said hook-shaped end.

17. A machine for fitting and removing tires and wheel rims for vehicles, comprising; a frame; supporting means mounted at said frame for coupling and turning a rim, onto/from which a tire is to be fitted/removed, about a rotational axis; and a working assembly movably supported by said frame and comprising a working head for fitting and removing said rim and said tire, first actuation means operatively connected with said working head for translational actuation in a direction that is substantially parallel to said rotation axis, a pusher, provided at said working head that is substantially tubular, is arranged substantially transversely to said rotation axis, and is provided with an abutment surface that is adapted for working contact with a side of said tire, at least one removal tool for removing said tire from said rim, and second actuation means that are operatively connected with said at least one removal tool for causing alternate movement thereof between an inactive configuration, in which the removal tool is at least partially accommodated within said pusher, and at least one active configuration, in which the removal tool protrudes at least partially from said pusher, said second actuation means comprise motion means for producing alternating rectilinear motion, said motion means being operatively connected with said at least one removal tool, said first actuation means comprises at least one first fluid-medium actuator that acts in a direction that is substantially parallel to said rotation axis.

18. The machine of claim 17, wherein said motion production means are connected with said at least one removal tool through at least one linkage.

19. The machine of claim 17, wherein said motion production means comprises at least one second fluid-medium actuator that acts in a direction that is substantially perpendicular to said rotation axis.

* * * * *